No. 814,902. PATENTED MAR. 13, 1906.
J. DEGEN.
MEANS FOR BALANCING CENTRIFUGAL PUMPS.
APPLICATION FILED JULY 6, 1905.

Witnesses:
John N. Lynch
Fred W. Barnacle

Inventor:
Julius Degen.
By his attorney:
F. H. Richards.

No. 814,902. PATENTED MAR 13, 1906.
J. DEGEN.
MEANS FOR BALANCING CENTRIFUGAL PUMPS.
APPLICATION FILED JULY 6, 1905.

Witnesses:

Inventor:
Julius Degen
By his attorney;
F. H. Richards.

No. 814,902. PATENTED MAR. 13, 1906.
J. DEGEN.
MEANS FOR BALANCING CENTRIFUGAL PUMPS.
APPLICATION FILED JULY 6, 1905.

Witnesses:

Inventor:
Julius Degen,
By his Attorney,

No. 814,902. PATENTED MAR. 13, 1906.
J. DEGEN.
MEANS FOR BALANCING CENTRIFUGAL PUMPS.
APPLICATION FILED JULY 6, 1905.

No. 814,902. PATENTED MAR. 13, 1906.
J. DEGEN.
MEANS FOR BALANCING CENTRIFUGAL PUMPS.
APPLICATION FILED JULY 6, 1905.

Witnesses:
John N. Lynch.
Ned W. Barnaely.

Inventor:
Julius Degen
By his attorney:
F. H. Richards.

UNITED STATES PATENT OFFICE.

JULIUS DEGEN, OF TRENTON, NEW JERSEY, ASSIGNOR, BY MESNE ASSIGNMENTS, TO LEA DEGEN PUMP COMPANY, OF TRENTON, NEW JERSEY, A CORPORATION OF NEW JERSEY.

MEANS FOR BALANCING CENTRIFUGAL PUMPS.

No. 814,902.     Specification of Letters Patent.     Patented March 13, 1906.

Application filed July 6, 1905. Serial No. 268,400.

*To all whom it may concern:*

Be it known that I, JULIUS DEGEN, a citizen of the Republic of Switzerland, residing in Trenton, in the county of Mercer and State of New Jersey, have invented certain new and useful Improvements in Means for Balancing Centrifugal Pumps, of which the following is a specification.

The invention has reference to that class of mechanisms or apparatus which produce their results mainly by centrifugal force. The invention is applicable to any of such devices and is mainly directed to centrifugal pumps.

The object of the invention is to render such devices more highly efficient by overcoming in a practical way that objectionable feature in this class of mechanisms which is commonly known as the "end thrust" of the shaft which carries and operates the revolving parts of such devices.

It is a further object of the invention to depend somewhat upon the power within the device to assist in the counterbalancing of such end thrust and to provide such mechanism or construction as will fully accomplish the results designed to be obtained.

It is also a design to apply the principles of this invention to apparatus embodying single or multistage constructions.

It is also a design of the invention to mount a plurality of the impellers upon a single shaft, to mount such shaft in suitable adjusting-bearings, and to locate such bearings substantially at or contiguous to the line of union between the casing-sections, whereby when the cover is removed the shaft and all of the elements carried thereby may be removed at will. It may be here remarked that in practice it will probably be found preferable to divide the casing into halves and to locate the bearing for the shaft contiguous to the line of union of such halves.

It is also a design of the invention to construct or build up such casing-halves of a number of laterally associated and connected sections, so that the casing as a whole may be formed to accommodate a greater or less number of impelling devices in order to vary the capacity of the apparatus.

It is a further design of the invention to so associate the impellers with the shaft that they may be readily and mechanically removed from the shaft at will without mutilating said impellers.

It is also a still further design of the invention to provide for the adjustment of the shaft in the plane of its longitudinal axis, whereby all the impellers which are mounted thereon may be simultaneously adjusted relatively to walls of the cells of the casing for the purpose of preventing end thrust of the shaft during the operation of the pump, so as to render the action of the pump more efficient; and to this end it is also an object to provide simple and efficient means for effecting the relative adjustments of said shaft.

It is also a design to provide suitable types of preferably automatic packing between the shaft and the walls of the casing and the partitions therein which will be effective to automatically compensate for such wear as may take place between said shaft and the openings through which the shaft is passed.

Means are provided whereby the throw of the fluid resulting from the action of the impellers may be gradually interrupted, so as to decrease the fluid velocity, whereby to transform kinetic energy of the fluid into hydraulic pressure, and also for switching the flow from one impelling stage to another next succeeding, and it is designed to so locate such means relatively to the impellers as to positively insure such deflection and for gradually checking the rotative motion of the fluid after leaving the impeller.

It is also a design to provide means by which the intake of air at those points where the shaft passes through the casing due to high suction from within when the pump is in operation will be prevented.

The invention may be embodied into any suitable form best calculated to yield efficient results, and a disclosure of one of such embodiments is illustrated on the accompanying sheets of drawings, whereon—

In the several illustrations similar characters of reference apply to similar parts.

Figure 10:
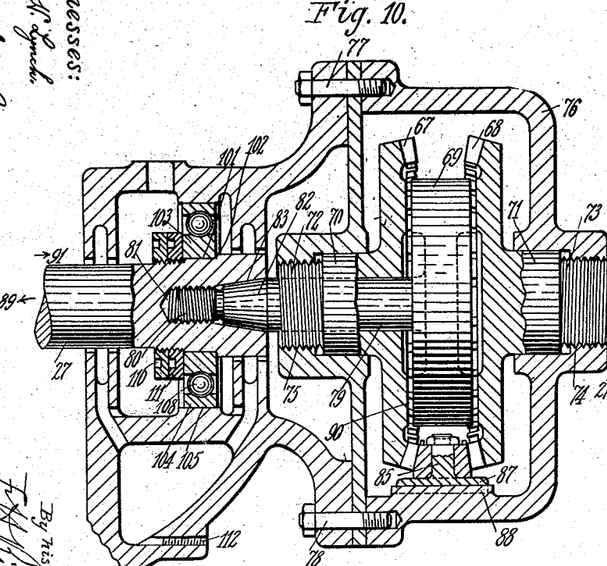
Fig. 10 illustrates an enlarged view in elevation and partly in section of means for counterbalancing the end thrust of the shaft.

A form of the invention as illustrated may comprehend a casing 12, which in the present instance may be of the multicellular type and may embody a plurality of sections 13 laterally associated and which may be united as in the present instance disclosed, by fastening devices 14, such as bolts, and a section 15 comprehending a volute channel 16, which emanates in a tangential discharge 17, may be secured to one side of the associated sections 13, while to the opposite side may be applied a section 18 embodying an inlet 19. It will be understood, however, that, if desired, the sections 15 and 18 may be united irrespective of the intermediate sections in order to produce another form of pump, or the invention may be embodied in the pump shown in Fig. 10. The sections 13, 15, and 18 may be so constructed and united as to form casing-halves 20 and 21, one of which, for instance, as 20, may be provided in the presence instance with supports 22 and bearings 23 and 24, while the other casing-half 21 may serve as a cover for said casing and which may be removed at will, so that access may be had to parts within the chamber formed by said casing, and also for permitting such parts to be removed at will, and said halves may each be provided with flanges 25, which may be bolted together by bolts 26.

Rotatably mounted in the bearings 23 and 24, respectively, is a shaft 27, upon which may be carried a plurality of impellers 28, operating in cells 29, which are formed in the present instance by partitions 30 and walls 31 of the casing. This shaft 27 is designed to carry the impellers 28, which may be secured thereto by sleeves 32, which are fitted upon said shaft and which may be provided with a tapering portion 33, which may be split partly along its body, as 34, and this portion 33 is adapted to take into a tapering bore 35 in the hubs 36 of the impellers 28. Each sleeve may be provided with a flange 37 at or near the hilt of the taper 33, and which may be provided with openings 38, through which may pass bolts 39, adapted to be screw-threaded into sockets 40, so that the sleeve may be forced home into its seat in the hub. This flange 37 may also be provided with screw-threaded openings 41, in which may take bolts 42, the ends 43 of which are adapted to bear against the face 44 of the hub 36. Hence when the bolts 39 are removed and the bolts 42 are forced inwardly the sleeve 32 may be readily and mechanically withdrawn from the hubs 36 of the impellers, so that the latter may be readily removed without hammering and battering.

The sleeves 32 in the present instance may be provided with an elongated portion 45, which extends from the flange 37 and into the bore 46 of the partitions 30. This sleeve portion 45 may be provided with a flange 47, which may take into said bore, and against said flange may take a packing 48, which may be pressed thereagainst by a ring 49, movable on the sleeve portion 45, and which may be forced against the packing by a spring 50, which also bears against a flange 51, carried by sleeve 45, such spring in the present instance being adapted to play in recesses 52 and 53, formed in said flanges, whereby the same may be held in place. Thus when the packing 48 is subjected to wear said spring 50 will move the ring 49 so as to further compress said packing toward the flange 47, whereby to compensate for any wear that may take place between the packing and the flange. In this conection it may also be remarked that while the packing device may be carried by the portion 45 of the sleeve 32 such device may be constructed, if desired, independently of said sleeve. It will also be noted in this connection that when the shaft 27 is adjusted longitudinally in either direction the spring 50 will be instrumental in causing the ring 49 and the packing 48 to also shift, whereby to always maintain the packing against the flange 47.

Figure 8:
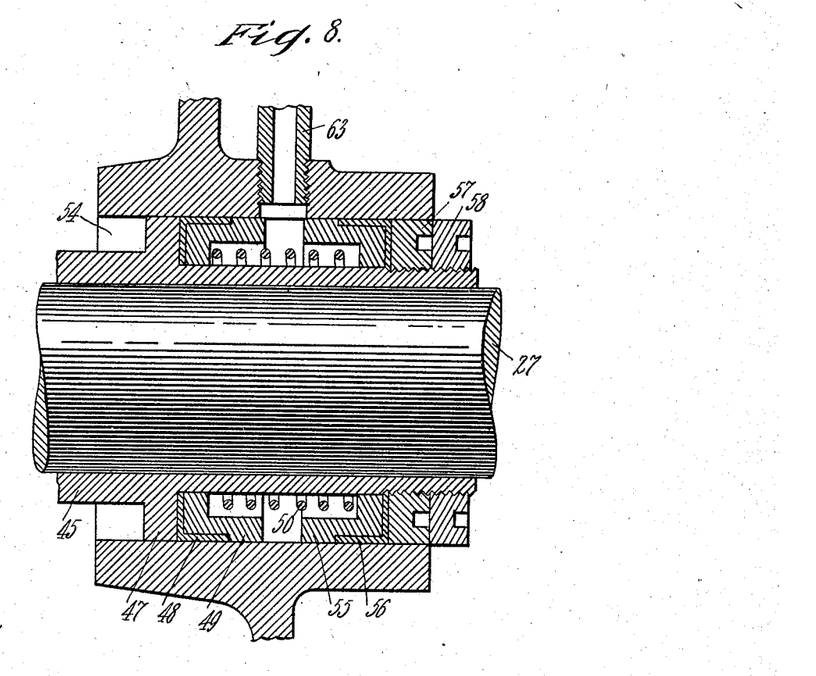
Fig. 8 illustrates an enlarged view of a packing used at those points where the shaft passes out of the casing.
Figure 9:
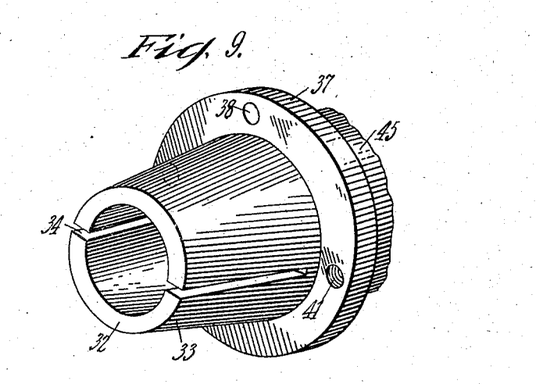
Fig. 9 illustrates a perspective view of a form of means for fastening the impellers to the shaft.

For packing the shaft 27 in the bore 54, where the shaft leads from the casing 12, the portion 45 of the last sleeve 32 may be provided with the flange 47, the movable ring 49, the packing 48, and a similar movable ring 55, similar to the ring 49, and a packing 56, which may take against a nut 57, adapted to be held in place by a jam-nut 58, which may be screw-threaded onto the portion 45, and the spring 50 may be interposed between the rings 49 and 55—for instance, as seen in Fig. 8. The packing for the bore 555 will be the same as it is for the bore 54 and may be carried by a sleeve 60, which in the present instance may be screw-threaded, as at 61, upon the hub 36 of one of the impellers.

In order to seal the pump against the intaking of air by suction through the bore 555 when the pump is in operation, a conduit 63 is provided which leads from the casing 12 and connects with the packing device for said bore 555, whereby the latter will be constantly filled with the fluid from within the casing.

It will now be seen that the shaft 27 will be effectually and automatically packed both at these portions where it emanates from the outer walls of the casing 12 and where it passes through the partitions 30.

Figure 11:
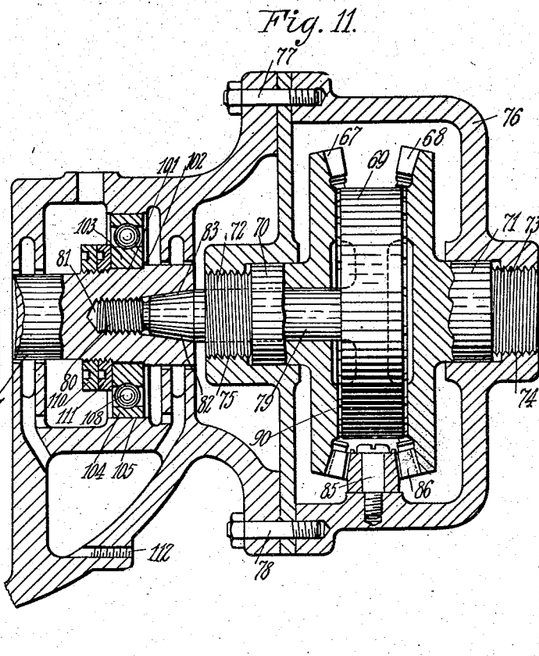
Fig. 11 illustrates a view similar to Fig. 10, but slightly modified.

In a structure of this or any other similar character the feature of novelty resides in so overcoming the end thrust to which the impeller-shaft may be subjected as to permit such shaft, as well as the impellers, to run free from that resistance which results from the creation of the end thrust of the shaft. In order to successfully accomplish this result, it is not only necessary to provide means for shifting the shaft in a direction opposite to the direction of thrust, but to maintain to some degree the location of the shaft after it has been so shifted. To accomplish this purpose, I provide chambers 64 and 65 on each side of the impellers 28 and the cells 29 and so locate the impellers 28 within the cells as spaces or passages 66 provide communication between the cells 29 and the chambers 64 and 65. These spaces or passages 66 are so varied on either side of the impellers 28 as to create variable pressure in the chambers 64 and 65, according to the position the impeller assumes within the cell, whereby to balance the pump during operation and successfully overcoming end thrust. This variability may be accomplished by shifting the shaft and the impellers, and to accomplish such shiftment I provide means for automatically shifting the shaft. In the forms illustrated in Figs. 1, 10, and 11 the shaft at one end is coupled to an arrangement which controls the axial movement of the shaft, according to the direction of thrust. An embodiment of such arrangement may consist of two members 67 and 68, which are mounted for rotation in coincidence with the rotation of the shaft 27, but which move axially in opposed directions, but independently and intermittently, according to the direction of thrust. These members may be operated in any suitable manner and are shown as being controlled and operated by a member 69, which may be positively associated with the shaft 27.

Figure 12:
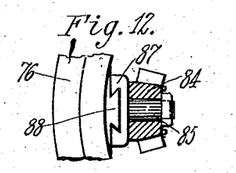
Fig. 12 represents in detail a construction whereby the stud carrying an intermediate gear for the gears of the counterbalancing device may be caused to float.

The members 67, 68, and 69 may of course be of any suitable character or construction and may be operated in any suitable manner. As here indicated, the members 67 and 68 comprise gears mounted upon hubs 70 and 71, one of which, as 70, is provided with a right-hand screw-threaded portion 72, while the other, as 71, is provided with a left-hand screw-threaded portion 73, and these portions are mounted in correspondingly-threaded portions 74 and 75, respectively, of a casing 76, which is secured by bolts 77 and 78 to the bearing-frame of the pump-casing. The intermediate member 69 may be in the form of a friction-disk which is mounted upon a spindle 79, passing through a bore in the hub 70, and which in the present instance is screw-threaded, as at 80, into a socket 81 of the shaft 27 and which may be held frictionally in place by a cone-shaped portion 82, which fits into a corresponding seat 83 in the end of the shaft. For the purpose of rotating the gears 67 and 68 in coincidence an intermediate gear 84 is located within the frame 76 and held in place by a stud 85. In the illustration, Fig. 11, this stud is affixed to the casing 76 and the gear 84 is provided with teeth 86 of sufficient length to permit a movement to and fro relatively to that gear of the gears 67 and 68, according to the direction of movement of said gears. In the illustration Fig. 10 and as the same is clearly seen in Fig. 12 the side 85 of this gear 84 is mounted upon a slide 87, which moves upon a guideway 88, so that as the gears 67 and 68 move the gear 84 will move also. If the shaft 27 is urged in the direction of the arrow 89 by an end thrust in that direction, the disk 69 will frictionally engage the face 90 of the gear 67, which will turn the hub 70 in its bearing 75, whereby by virtue of the screw-threads 72 the shaft 27 will be urged in the direction of the arrow 91. At the same time by virtue of the gear 84 serving to communicate the motion from the gear 67 to the gear 68 said gear 68 will also move in coincidence with the gear 67. If instead of moving in the direction of the arrow 89 the end thrust should urge the shaft 27 in the direction of the arrow 91, the contact between will be between the disk 69 and the gear 68, and the operation just explained will therefore be reversed. Thus it will be seen that I have provided means depending upon the direction of thrust whereby the end thrust of the shaft may be automatically counterbalanced.

Figure 1:
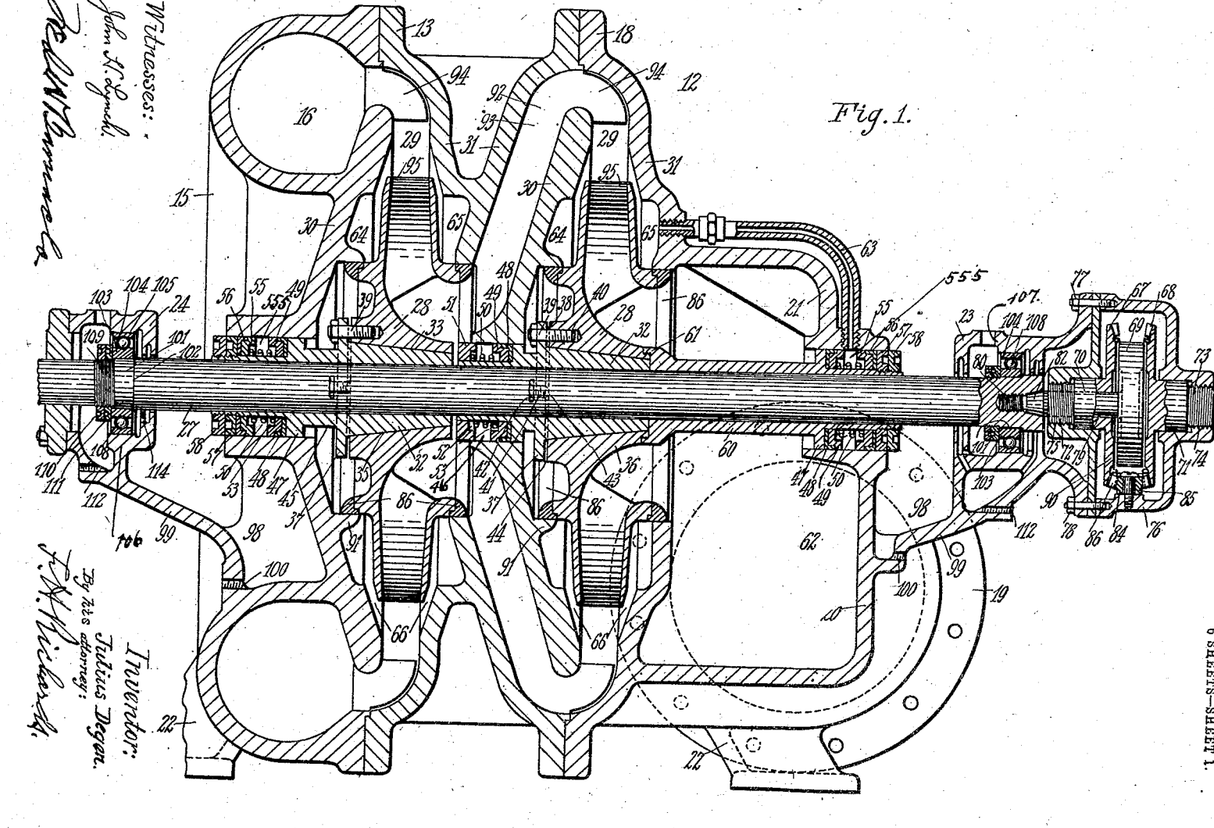
Figure 1 illustrates a longitudinal section of a pump of multistage type and embodying said invention.
Figure 2:
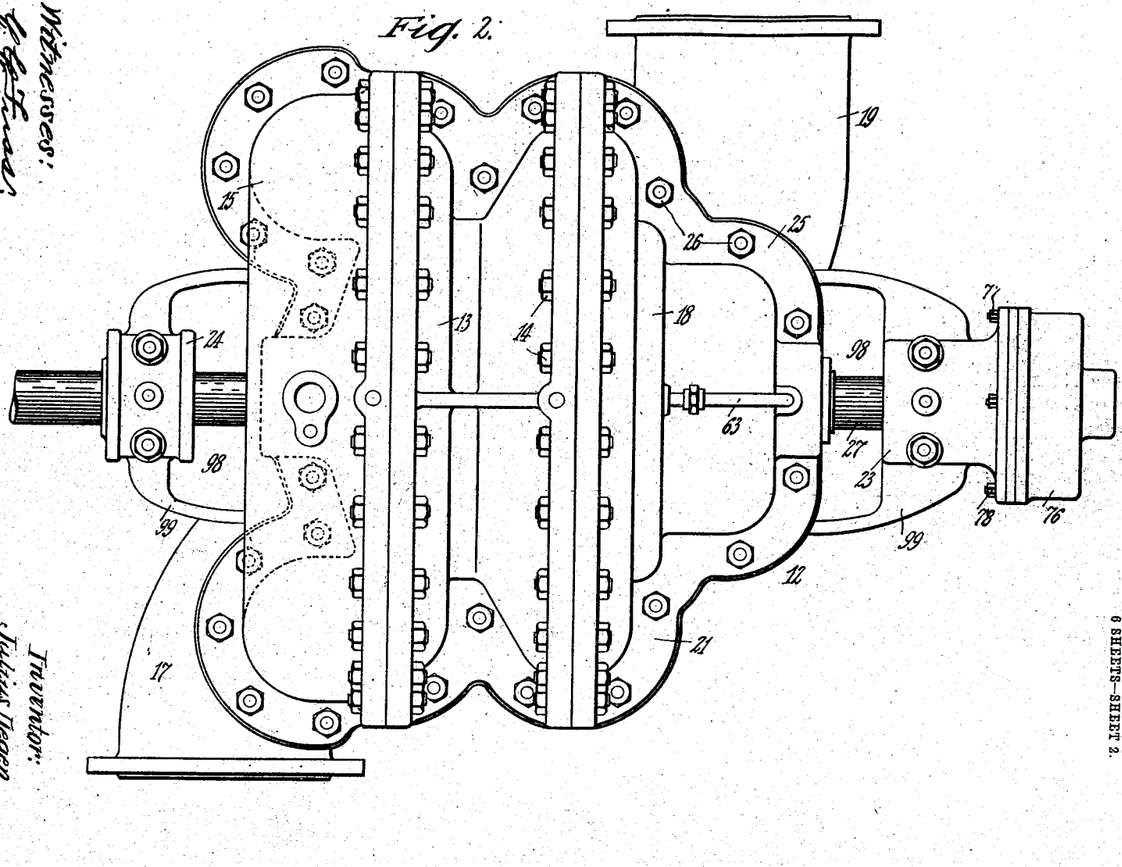
Fig. 2 illustrates a top plan view thereof.
Figure 3:
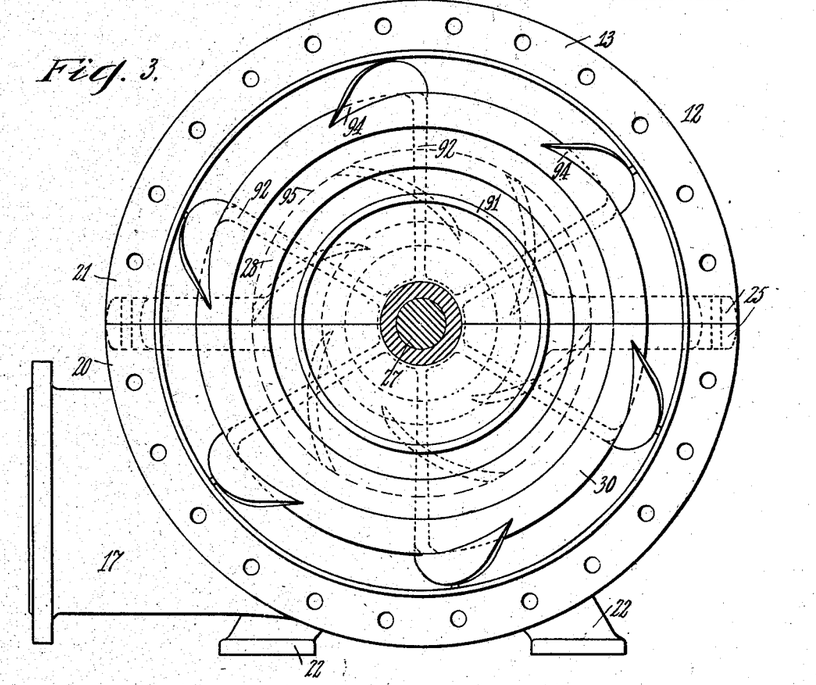
Fig. 3 illustrates an end elevational view of one of the stages, partly in section.
Figure 4:
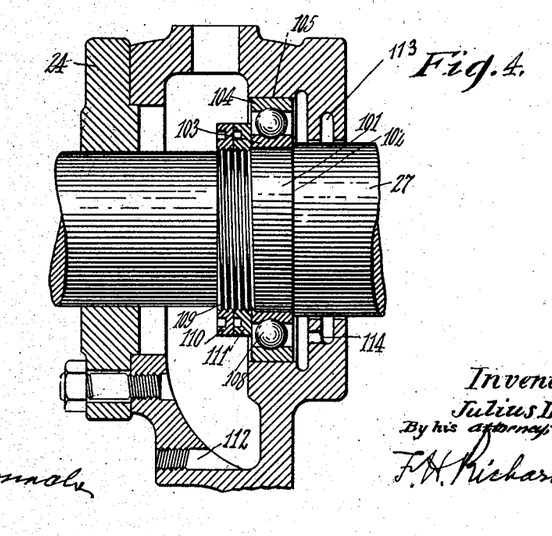
Fig. 4 illustrates an elevational view, partly in section, of a bearing of an impeller-shaft.
Figure 5:
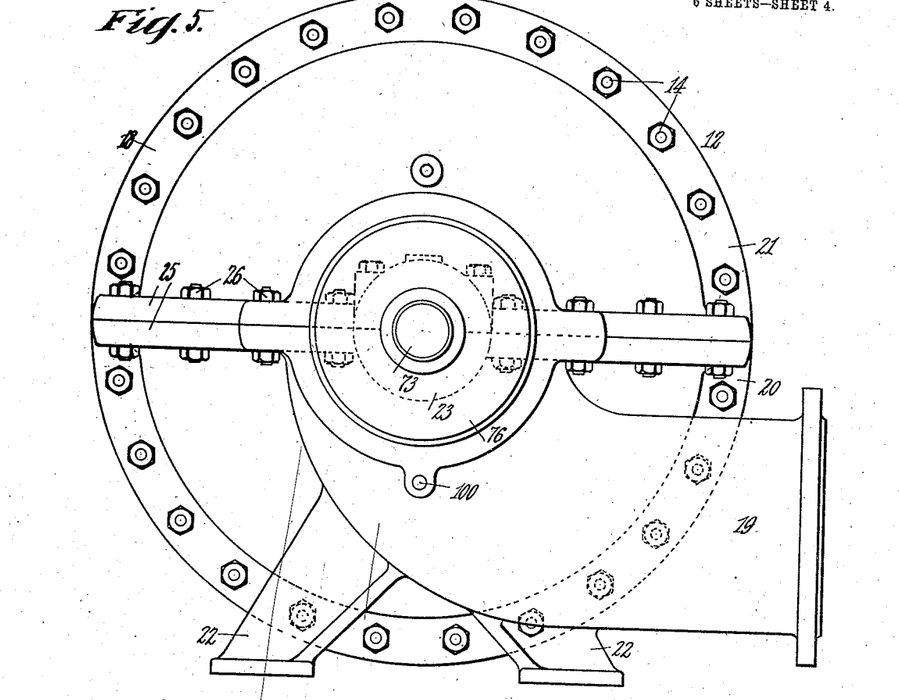
Fig. 5 illustrates an end view of the suction end of the pump-casing.
Figure 6:
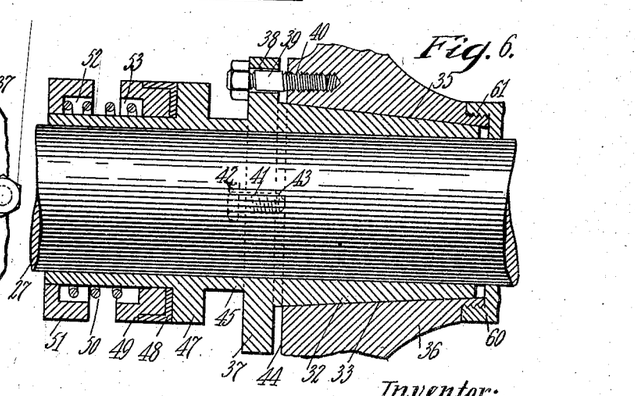
Fig. 6 illustrates a removable securing device adapted to be used between the shaft and the impellers and also illustrates a form of one of the automatically-adjustable packings.
Figure 7:
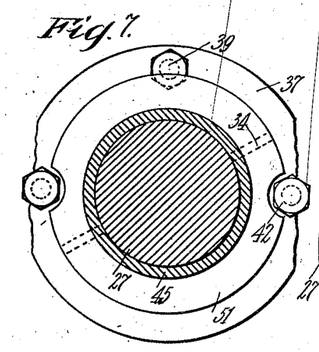
Fig. 7 illustrates an end view showing means for moving the securing device relatively to the shaft and the impellers.

In order that the fluid which is thrown out from the impellers may be transposed from one stage to another when the pump is in operation, there is provided a series of deflectors 92, (more clearly seen in Fig. 3,) which are so disposed or located in the path of peripheral flow as to sufficiently break up the velocity which the flow possesses when it leaves the impellers. These deflectors are further intended to decrease the fluid velocity gradually, thus transferring the kinetic energy of the fluid into hydraulic pressure. The deflectors 92 may be carried by radial ribs 93 and are provided with beaks 94, (more clearly shown in Fig. 3,) which are located approximately contiguous to the peripheries 95 of the impellers 28, so that they may exert their influence upon the fluid substantially at a point where the fluid is liberated from the impellers, and therefore, as seen in Fig. 1, the beaks 94 of said deflectors may, if desired, extend a substantial distance over the partitions and into the cells 29. Thus it will be seen that as the water enters the pump through the inlet 17 it will be caught up by the impellers and whirled with centrifugal force to the peripheries of the cells 29, when it will be transformed by the deflectors to the next succeeding stage and the operation repeated throughout the pump structure until it reaches the volute channel emanating into the tangential discharge, where it leaves the latter under high and accumulated pressure.

For the purpose of forming a packing at the points between the impellers 28 the walls of the casing 12 and the partitions I may provide rings 86 of some suitable material, such as brass, which may be carried by the impellers 28 and which may contact with flanges 91 on the partitions. For the purpose of receiving such leakage as may be discharged from the packings at the ends of the casing one of the halves may be provided with chambers 98, which may be formed in the brackets 99, which supports the bearings, and which chambers 98 may be provided with ports 100, through which the fluid may be drawn off.

The shaft may be provided with reduced portions 101, creating shoulders 102, against which may take ball-bearing races 103, corresponding to a race 104 and which may be mounted in seats 105 of bearings 106 and 107 and between which circuits 108 balls may operate. For the purpose of holding the ball-race in place the shaft may be screw-threaded at 109 to receive nuts 110 and 111. The bearings just described will be furnished with a suitable lubricant, in which the ball-bearings may run, and when it is desired to furnish the bearings with a new lubricant the old may be drawn off through the opening 112. For the purpose of preventing the lubricant from oozing out from the bearing such lubricant as may fly from the parts may take into a duct 113, which is provided with an outlet 114, leading back into the chamber.

It will now be seen that the casing may be built up of a series of independent sections suitably jointed together and which may form two independent casing-halves, one of which may support a shaft upon which is mounted a plurality of impelling stages and the other of which may serve as a cover and which is attachable to the other section and adapted to be removed, whereby to not only permit ready access to the parts within the casing, but to also allow the shaft and its related elements to be lifted out of the casing at will. It will also be observed that the impellers are so mounted upon the shaft that they may be easily removed mechanically without rendering them unfit for use, which is a desideratum in this class of devices. It will also be noticed that there are provided suitable automatically-operating packing devices which automatically take up the wear and prevent leakage at the bearings through which the shaft passes from one stage to another and to the outside of the casing. It will be further noticed that means are provided to not only deflect the course of the fluid when the same is thrown against the casing by the centrifugal action of the impellers and also for catching or interrupting the flow at a point contiguous to the point where it leaves the rim of the impeller, but for also decreasing the fluid velocity gradually, thus transferring the kinetic energy of the fluid into hydraulic pressure. It will also be observed that I provide means for longitudinally shifting or adjusting the shaft, together with the impellers thereto secured, so that said impellers may be simultaneously adjusted with the adjustment of the shaft to bring the mouth of said impellers in relative different positions to the walls and partitions of the casing, whereby to equalize the thrusts of the shaft, and thereby the operation of the device.

While this description appertans in the main to a pump of the multistage type, it is obvious that the principles and designs of this invention may be embodied into a single-stage pump.

Within the purview of this invention I may resort to various constructions or assemblage of parts, and it is comprehended that the results sought to be obtained may be effected through the instrumentality of various constructions, and therefore it must be understood that the construction illustrated on the accompanying sheets of drawings, together with the detail description thereto appertaining, shall not be considered as confining this invention to this particular form of mechanism herein illustrated and described.

Having thus described this invention, I claim—

1. In a device of the character specified, the combination with a casing having a cell with chambers in communication therewith, an impeller rotatably mounted in said cell, and means to automatically shift the impeller relatively to the walls of the cells to vary the size of the outlet from the chambers to the cell whereby to balance the device, said means consisting of a member adapted to be actuated from the impeller-shaft, and means adapted to be operated thereby in alternation for shifting the member in opposite directions also in alternation.

2. In a device of the character specified, the combination with a casing having cells with chambers in communication with each cell, impellers rotatably mounted in each cell, and means to automatically shift the impellers relatively to the walls of the cells to vary the size of the outlets from the chambers to the cells whereby to balance the device, said means consisting of a rotating member adapted to be actuated by the shaft carrying the impellers, and means to be operated thereby in alternation for shifting the member in opposite directions also in alternation.

3. In a device of the character specified, the combination with a casing made up of a plurality of sections, and comprising cells with chambers in communication therewith, a rotatably-mounted shaft, impellers carried by the shaft, devices located on said shaft for removably securing the impellers to the shaft, automatic packing devices carried by said devices, and means to automatically shift the shaft longitudinally to adjust the impellers relatively to the walls of the cells, said means consisting of a rotatably-mounted member adapted to rotate in unison with the shaft, and means adapted to be moved axially by said member, said axially-movable members being operated by the alternating contact of the member carried by the shaft, with said members.

4. A balancing device for centrifugal pumps consisting of a member adapted to be affixed to an impeller-shaft, of a member having a bearing in a left-hand screw-threaded member, of another member having a bearing in a right-handed screw-threaded member, means for operating said members in unison, the member affixed to the shaft being adapted to alternately contact with the members and move them axially in opposite directions in their screw-threaded bearings, whereby to shift the shaft in opposite directions.

5. In a device of the character specified, the combination with a shaft, of a disk rotating therewith, a pair of members adapted to be operated by the disk, said members being adapted to operate axially in opposite directions when one of them is in contact with the disk, and means to rotate the members in unison, and in opposite directions.

6. In a device of the character specified, the combination with a shaft, of a disk connected therewith two members adapted upon contact with the disk to shift the latter in opposite directions, each member operating in a screw-threaded bearing, said screw-threaded bearings being left and right handed respectively, and means operating in conjunction with both members for operating them in unison axially.

7. In a device of the character specified, the combination with a disk attached to a shaft, of a member having a spindle which is provided with a left-handed screw-thread, of another member having a spindle provided with a right-handed screw-thread, means for causing the two members to move in unison in said threads when the disk alternately contacts with said members.

JULIUS DEGEN.

Witnesses:
FRED. W. BARNACLO,
JOHN S. SEIFERT.